June 15, 1965 J. S. COUSE 3,189,181
UNDERDRAIN CONSTRUCTION FOR TANKS
Filed April 24, 1961

*INVENTOR.*
JOHN S. COUSE
BY
*Busser, Smith and Harding*
ATTORNEYS

# United States Patent Office 3,189,181
Patented June 15, 1965

3,189,181
UNDERDRAIN CONSTRUCTION FOR TANKS
John Scott Couse, Toronto, Ontario, Canada, assignor to Crane Co., Chicago, Ill., a corporation of Illinois
Filed Apr. 24, 1961, Ser. No. 105,222
10 Claims. (Cl. 210—291)

This invention relates to underdrain constructions for tanks for use in ion-exchange or filtering apparatus, or the like.

One form of ion-exchange or filtering apparatus in general use today involves the use of a flat bottom tank having a water off-take system positioned adjacent the tank bottom. This off-take system comprises a plurality of conduits extending laterally from a header and is known in the art as a underdrain header lateral system. Since the underdrain construction in accordance with this invention is similar when used either with ion-exchange apparatus or with filtering apparatus, for simplicity, it will be described in connection with ion-exchange apparatus. In ion-exchange apparatus, since the tank contains a bed of small particles of ion-exchange resin which reacts with the raw water to be purified, each conduit or lateral has screening across the inlet openings thereof to prevent the passage of the resin particles in the tank. In operation, the raw water, i.e., the water to be treated, is delivered to the tank at its top, passes through the bed of resin therein and is withdrawn through the laterals and the header.

In the prior art constructions, the screen for the laterals was usually a stainless steel or a plastic cloth and similar materials were used for both the laterals and the screening, i.e., a stainless steel cloth or wire screen was used with a stainless steel lateral and a plastic cloth was used with a plastic lateral. These prior constructions have been unsatisfactory since the use of a stainless steel lateral is very expensive because of the cost of the material and because of the costly welding construction of the joint between the screen and the lateral. The plastic construction is unsatisfactory because the plastic screens were weak and thus easily deformed by a pressure drop thereacross so that the screens are loosened from the lateral.

It is the general object of this invention to provide a lateral construction for an underdrain apparatus which avoids the above-discussed problems. Briefly stated, this object is accomplished by constructing the lateral of a plastic conduit having a stainless steel screen joined thereto in a manner to prevent leakage and to withstand pressure drops.

The above and other objects and features of the invention will become apparent from the following description, read in conjunction with the accompanying drawing in which.

Figure 1:
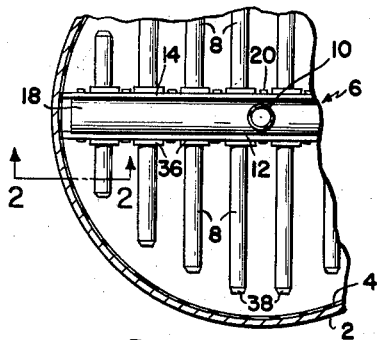
FIGURE 1 is a fragmentary plan view of an underdrain construction comprising laterals provided in accordance with this invention.
Figure 2:
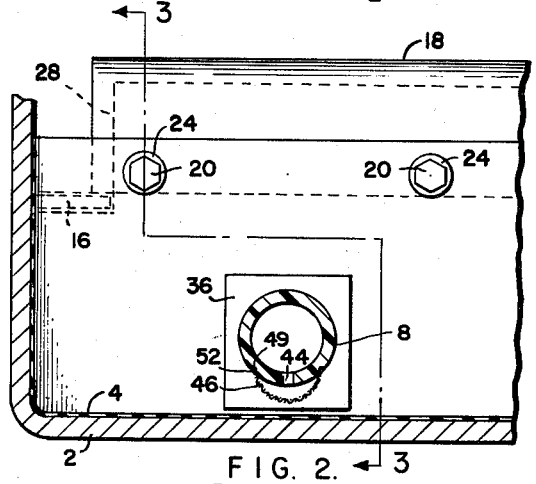
FIGURE 2 is a sectional view taken on a plane indicated at 2—2 in FIGURE 1.

Referring to the drawing, there is shown therein a tank 2 adapted to contain the resin bed and having an underdrain apparatus mounted at the bottom thereof. The tank 2 is made of ordinary steel and has an inner lining 4 of a suitable material, such as rubber, to protect the tank 2 from contact with the contents of the tank and thus prevent corrosion. The underdrain apparatus comprises a header, generally indicated at 6, extending diametrically across the tank 2 and having secured thereto a plurality of laterally projecting conduits or laterals 8. The header 6 is also made of steel and has an outlet indicated at 10.

Figure 3:
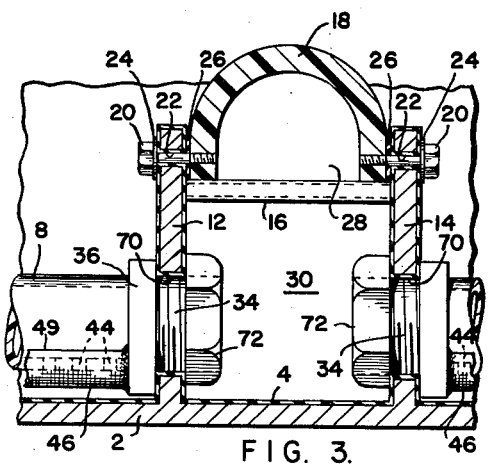
FIGURE 3 is a sectional view taken on a plane indicated at 3—3 in FIGURE 2.

The header 6 comprises a pair of spaced and oppositely disposed walls 12 and 14 formed integrally with the bottom of the tank 2 and projecting upwardly therefrom. The walls 12 and 14 are lined with a protective covering of rubber. The ends of the walls 12 and 14 join with the side wall of the tank 2. A horizontally extending shoulder member 16 projecting from the side of tank 2 is provided at each end of the walls 12 and 14 and extends therebetween. Each member 16 is covered with a protective lining of rubber. A generally U-shaped cover member 18 is secured to the walls 12 and 14 in an inverted position, as is best shown in FIGURE 3, by means of a plurality of bolts 20. Bolts 20 project through lined openings 22 in the walls 12 and 14 for threaded engagement with threaded openings in the side walls of cover 18. Suitable washers 24 and 26 are provided between the head of the bolts 20 and the outer side of the walls 12 and 14 and between the inner side of walls 12 and 14 and the cover 18, respectively. The cover is made of a suitable plastic which will resist corrosion by the resin contained in the tank 2. The ends of the cover 18 are enclosed by end walls indicated at 28. These end walls 28 contact the members 16 and are suitably sealed to prevent leakage past this contacting area. Thus, there is provided a diametrically extending header chamber 30 which is tightly sealed against leakage between the chamber 30 and the exterior of the header 6.

Figure 4:
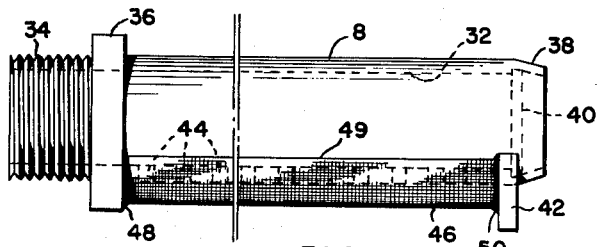
FIGURE 4 is a side elevation of a lateral in accordance with this invention.
Figure 5:
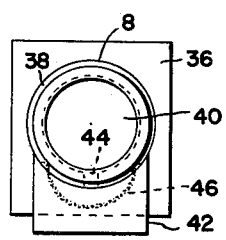
FIGURE 5 is an elevation of a lateral in accordance with this invention viewed from the right in FIGURE 4.

While each lateral 8 may vary in length, as shown in FIGURE 1, and many vary in diameter in accordance with variations in design requirements, each lateral 8 is in all other respects the same whereby only one lateral 8 will be described in detail, it being apparent that the other laterals may be constructed in a similar manner. Referring to FIGURE 4, each lateral 8 is of tubular construction and has a cylindrical internal passageway 32 extending axially therethrough. One end 32 of the lateral 8 is threaded, the threaded portion terminating at an enlarged plastic shoulder member 36, which is joined with lateral 8 adjacent the threaded end 34, as by a solvent weld. The other end 38 of the lateral 8 has a plastic plate 40 positioned to be seated in a counterbore at this end 38 for closing the passageway 32. The closed end 38 is swaged inwardly to retain the closure plate 40 therein. The closed end has a plate 42 welded thereto for supporting the closed end of the lateral 8 when it is positioned in the tank 2. The bottom of the plate 42 is adapted to rest on the bottom of the tank 2 to space the lateral 8 therefrom. A plurality of radially extending, axially spaced slots 44 are formed in lateral 8 along the portion thereof which is to be the bottom of lateral 8 in its position within the tank 2. The openings 44 provide communication between the interior of the lateral 8 and the exterior thereof.

Figure 6:
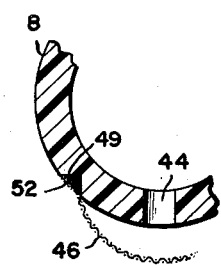
FIGURE 6 is a fragmentary view illustrating one form of junction between the screen and the lateral.

An elongated screen 46 is secured to the bottom of the lateral 8 in a manner to enclose the openings 44 and to screen such openings from contact with the contents of the tank 2. The ends of the screen 46 are secured to the member 36 and the support plate 32 by a suitable heat welding operation as is shown by the heat welds 48 and 50 respectively. The axially extending edges 49 of the screen 46 are joined with the lateral 8 at locations circumferentially spaced on opposite sides of the openings 44. These edges 49 of screen 46 are secured to the laterals 8 by a suitable welding operation which is applied, as shown in FIGURE 6, at axially extending notches 52 in the laterals 8. In the FIGURE 6 form of screening, the screen 46 is bent in an arc and is positioned in a generally V-shaped notch 52. In the form of the invention shown in FIGURE 7, a generally U-shaped screen 60 is employed and projects into an upwardly extending slot 62 in the tubular portion of the lateral 8.

While either heat welding or solvent welding processes may be used to join the edges of the screen with the tubular portion of the lateral 8, solvent welding provides a better weld. The heat welding process would involve the use of a plastic rod which is heated with a jet of hot air, this jet also heating the base material. The screening is thus secured with the edges embedded in the plastic, the holes of the screen serving to receive the plastic welding material. In the solvent welding process contemplated in constructing the apparatus in accordance with this invention, the edge of the screen is slipped into the notch or groove, and a suitable solvent is added thereto. The solvent may comprise a solution of the same material as that from which the laterals are made.

Figure 7:
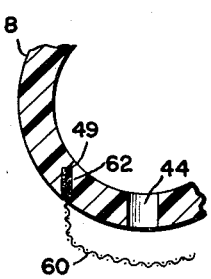
FIGURE 7 is a fragmentary view illustrating another form of junction between the screen and the lateral.

While the junctions of the screen and tubular portion of the lateral 8 shown in FIGURES 6 and 7 involve the use of the grooves, it will be apparent that there may be merely flat contact between the edges of the screen and the lateral 8, the welding processes serving to secure the screen to the lateral 8. However, it will be apparent that the construction shown in FIGURES 6 and 7 would tend to provide a better seal and a stronger connection.

It will thus be apparent that the lateral construction in accordance with this invention provides a welded junction which will prevent leakage of the resin into the interior of the lateral 8 and will also be strong enough to withstand forces tending to loosen the screen from the lateral 8.

The lateral 8 is constructed of a suitable plastic material which will resist corrosion by the resin contained in the tank. One satisfactory plastic for lateral construction is polyvinyl chloride. However, in contrast with the prior art constructions, the screen is made of stainless steel. The mesh size of the screen will, of course, be such that the screen will prevent the passage of the particles of the resin in the tank.

The laterals 8 are connected to the header 6 by projecting the threaded end 34 thereof into lined openings 70 in the walls 12 and 14 adapted to receive these threaded ends 34. Suitable lock nuts 72 are threaded onto the ends 34. Suitable lock nuts 72 are threaded onto the ends 34 to clamp the walls 12 and 14 between the shoulder members 36 and the nuts 72 to thereby provide a tight contact between the outer side of the walls 12 and 14 and the shoulder members 36 whereby leakage is prevented between the header chamber 30 and the exterior of the header. In the assembled condition, the laterals 8 project outwardly from the walls 12 and 14 to approximately the inner diameter of the tank 2. The outer ends 38 of the laterals 8 are supported on the tank bottom in spaced relation thereto by means of the support plates 42.

In the operation of an apparatus comprising the underdrain apparatus in accordance with this invention, as for example, an ion-exchanger or demineralizer, the raw water is delivered to the tank 2 at the upper end thereof and flows downwardly through the resinous material. The treated water passes through the screens 46 and openings 44 into the interior of the laterals 8. From the laterals 8 the water enters the header chamber 30 and is withdrawn from the header through the outlet 10. By the construction in accordance with this invention an effective seal is provided between the screening 46 and the header 6 so that none of the resinous material will pass into the laterals 8. Also, the welded arrangement provides a strong construction whereby forces tending to loosen the screening 46 can be readily withstood. These advantages are attained by the use of a stainless steel cloth screen which is welded to a plastic lateral.

Another advantage of the underdrain construction in accordance with this invention is the simplicity resulting from constructing the header as an integral part of the tank. Such a construction eliminates the problem of a poor joint at the header bottom and permits locating the laterals closer to the bottom of the tank with the advantage that there are a minimum of dead spaces. Also, it is noted that the cover has a generally circular construction and is thus streamlined to prevent dead spaces in the bed in which the header is embedded.

It will be evident that various details of construction may be modified without departing from the invention and it is accordingly to be understood that the invention is not to be regarded as limited except as required by the following claims.

What is claimed is:

1. Liquid treating apparatus comprising a tank, a tubular member of plastic positioned adjacent the bottom of said tank, passageway means in said tubular member for fluid flow between the exterior and the interior of said tubular member, means providing for fluid communication between the interior of said member and the exterior of the tank, means enclosing the exterior of said passageway means including a metallic screen, and means joining the longitudinal edges of said screen with the exterior of said tubular member including a weld formed in a cut-out in said tubular member, the edge of said screen extending within said cut-out.

2. Liquid treating apparatus comprising a tank, a plastic tubular member within said tank adjacent the bottom of said tank and having a closed end, means providing for fluid communication between the interior of said member and the exterior of the tank, a plurality of openings in said tubular member spaced longitudinally thereof, and an elongated screen joined with said tubular member at the longitudinal edges of said screen, the longitudinal edges of said screen being joined to said tubular member by a welded junction formed in grooves extending axially of said tubular member and spaced circumferentially outwardly in both directions from said openings.

3. Apparatus as claimed in claim 2 wherein each of said grooves has a generally V-shaped cross-section and said screen has an arcuate cross-section.

4. Apparatus as claimed in claim 2 wherein each of said grooves is an elongated slot and said screen has a generally U-shaped cross-section.

5. Liquid treating apparatus comprising a tank, a header within said tank extending across the bottom thereof, at least one plastic tube extending laterally from said header, means defining a passageway extending from the exterior of said sube to the interior of said header including a plurality of openings in said tube spaced longitudinally thereof, means providing for fluid communication between the interior of said header and the exterior of the tank, an elongated screen of a corrosion resistant metal joined with said tube at the longitudinal screen edges, the longitudinal edges of said screen being joined to said tubular member by a welded junction formed in grooves extending axially of said tubular member and spaced on opposite sides of said openings.

6. Liquid treating apparatus comprising a tank, a header at the bottom of said tank interiorly thereof including a pair of spaced walls joined integrally with and extending upwardly from the bottom of said tank a short distance relative to the top of the tank and cover means cooperating with said walls to define a header chamber at the bottom of the tank, said cover being exposed to the contents of the tank surrounding the tubes, means providing for fluid communication between the interior of said header and the exterior of the tank, and a plurality of tubes extending laterally outwardly from said header, each of said tubes having means defining a passageway between the exterior of said tube and said header chamber, each of said passageways comprising a plurality of openings in said tube and spaced longitudinally thereof, each of said tubes being constructed of plastic and having an elongated screen of corrosion resistant metal joined with said tube at the longitudinal edges thereof, the longitudinal edges of said screen being joined to said tubular member by a welded junction formed in grooves extending axially of said tubular member and spaced on opposite sides of said openings.

7. Apparatus as claimed in claim 6 wherein said cover means projects upwardly from said walls in an arcuate streamlined configuration.

8. Apparatus as claimed in claim 6 wherein said tank is internally lined with a corrosion-resistant lining.

9. Liquid treating apparatus comprising a tank, a hollow elongated plastic member within said tank positioned adjacent the bottom of said tank, passageway means providing fluid flow communication between the interior and the exterior of said member, means providing for fluid communication between the interior of said member and the exterior of the tank, means enclosing said passageway means to intersect fluid flow between the interior and exterior of said member including a metallic screen, and means securing the longitudinal edges of said screen with said plastic member including longitudinal grooves in said member receiving said screen edges therein in secured condition and providing sealed joints between said screen and said member.

10. Liquid treating apparatus comprising a tank, a hollow elongated plastic member within said tank positioned adjacent the bottom of said tank, passageway means providing fluid flow communication between the interior and the exterior of said member, means providing for fluid communication between the interior of said member and the exterior of the tank, means enclosing said passageway means to intersect fluid flow between the interior and exterior of said member including a metallic screen, and means securing the longitudinal edges of said screens with said plastic member including longitudinal welds joining the longitudinal edges of said screen with said plastic member and providing sealed joints between said screen and said member.

References Cited by the Examiner

UNITED STATES PATENTS

| 647,780 | 4/00 | Wilson | 210–264 |
|---|---|---|---|
| 2,149,680 | 3/39 | Jewell | 210—291 X |
| 2,789,696 | 4/57 | Jahnig et al. | 210—279 X |
| 2,818,977 | 1/58 | Crist | 210—291 |
| 2,956,682 | 10/60 | Stephan | 210—279 X |
| 3,009,577 | 11/61 | Gugeler | 210–289 |
| 3,080,063 | 3/63 | Krynski et al. | 210—330 |

FOREIGN PATENTS

| 406,025 | 2/34 | Great Britain. |
|---|---|---|
| 461,754 | 2/37 | Great Britain. |

REUBEN FRIEDMAN, *Primary Examiner.*

HERBERT L. MARTIN, *Examiner.*